July 12, 1960  S. F. JAROS  2,944,784
GAS COCK WITH SAFETY DETENT
Filed Feb. 9, 1959
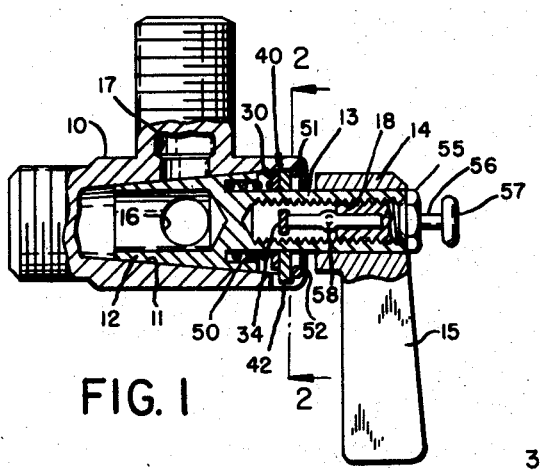
INVENTOR.
STANLEY F. JAROS
BY
Ely, Pearne & Gordon
ATTORNEYS

United States Patent Office 2,944,784
Patented July 12, 1960

2,944,784

GAS COCK WITH SAFETY DETENT

Stanley F. Jaros, 18850 S. Woodland, Cleveland, Ohio

Filed Feb. 9, 1959, Ser. No. 791,951

4 Claims. (Cl. 251—110)

This invention relates to a detent arrangement of very low cost for use in subassemblies comprising a stem for imparting arcuate motion to a control member where it is desired that the stem be rotated between two extreme angular positions and that the stem be locked at one of such angular positions to be moved therefrom only upon releasing of the lock of the detent by a motion other than the angular motion required in moving the stem between its extreme angular positions.

The invention is particularly applicable to use in gas cocks or valves where code requirements specify that the valve shall not be capable of being turned on unless a separate release is first actuated. This is a common safety requirement specified by law in many areas.

The invention contemplates the provision of a casing where all openings may be circular bores, the main bore being provided with a short key slot, without any quarter-milling or cast-in irregularities or the like being necessary. The main bore receives very inexpensively made members which are so arranged that a stem rotated within such casing is limited at two extreme angular positions and is positively but releasably locked by a detent at one of such positions.

More particularly the invention contemplates the use of a pair of adjacent washers one of which may be designated a stop washer and the other of which may be designated a detent washer, the washers being related with other parts to accomplish the desired mechanical relationship. The washers can be manufactured at very low cost and therefore enable significant economies to be realized.

One concrete example of the invention is described in some detail below and is illustrated in the accompanying drawings in which:

Figure 1 is a side elevation in cross-section of a valve assembly embodying the present invention.

Figure 2 is a view taken on the plane of line 2—2 in Figure 1.

Figure 3 is a detail view of the detent washer employed in the illustrated example.

Figure 4 is an isometric view of the washer shown in Figure 3.

Figure 5 is a view similar to Figure 4 but showing in addition the stop washer employed in this embodiment of the invention.

Figure 6 is a view similar to Figure 5 but showing in addition the valve plug stem on which the detent washer and the stop washer are received.

Shown in Figure 1 is a valve casing 10 having a plug seat 11 against which is received a valve plug 12 which is provided with a plug stem 13. In the particular example illustrated, the end of the plug stem 13 is provided with a boss 14 which has integrally formed therewith a handle 15 extending radially from the axis of the stem and suitably affixed thereto as by brazing or the like.

The valve is illustrated in its closed position, the lateral port 16 in the valve plug 12 being cut off from the gas passage 17. When the valve is rotated 90° the port 16 communicates with the passage 17 and the valve is in open position. The passage 17 and the main bore which includes the valve seat 11 are circular, a short key slot 21 being formed at the handle end of the main bore. It will be noted that the housing does not include any quarter-milling or cast-in irregularity or the like.

The stem 13 has a bore 18 formed thereon, which in the illustrated example of the invention is a threaded bore (Figures 2 and 6). The stem 13 has an arcuate exterior surface 19 and also has a flat formed thereon which intersects the arcuate exterior surface and also intersects the bore 18.

The adjacent washers 30 and 40 are received on the stem 13 and have arcuate inner edge portions 31 and 41, respectively, received on the arcuate exterior surface 19 of the stem. The washer 40 constitutes a stop washer. A projection 42 is provided on such stop washer and is received within the key slot 21 formed at the end of the casing 10 to key the stop washer 40 against rotation. The stop washer has a projection 44 extending radially inwardly from its arcuate inner edge portions 41. When the stem is turned between its extreme angular positions, it abuts against the opposite side of this projection 44; that is, in one angular position (the open position) it abuts against a first side 45 and in the opposite position (the illustrated closed position) it abuts against the second opposite side 46.

The other washer 30 constitutes a detent washer which has an inboard section generally indicated by the reference numeral 32 which is located radially inwardly of its associated arcuate inner edge portion 31. The inboard section 32 has edge portions 33 formed as a chord of the circle on which lies the arcuate inner edge portions 31. These chordal edge portions 33 are received on the flat 20. A lug 34 is provided which is integral with a part of the inboard section 32 and which extends further radially inwardly beyond such chord 33 to the diametrical center of the detent washer 30 and to within the bore 18. There is formed in the inboard section 32 a radially extending split 35 which divides the inboard section into two parts, the first of which includes the lug 34. Extending laterally from the radially extending split 35 is a continuation 36 thereof which is preferably formed as an arcuately extending continuation, as shown. The first part of the inboard section 32 comprising the portion which is above the split 35 as shown in Figure 3 is axially displaced progressively more and more at locations proceeding from the termination of the continuation 36 of the split and proceeding to the juncture thereof with the radially extending split 35, as perhaps most clearly indicated in Figure 4. The associated edge of the radial split 35 is indicated in Figure 4 by the reference numeral 37, and it will be seen from Figure 5 that this edge is at the same axial location as the stop washer 40 and abuts the side 45 of the stop washer projection 44 when the flat 20 on the stem 13 abuts the opposite side 46 of the stop washer projection 44, as indicated in the drawings.

A compression spring 50 is provided between the plug 12 and the detent washer 30 and this spring urges the detent washer against the stop washer 40. This subassembly is retained by a snap ring 51 which is received within a lip 52 defined by a circular groove formed near the end of the main casing bore.

Pushing means is provided extending through the valve stem bore 18 for engaging the lug 34 to urge the washers 30 and 40 apart against the bias of the spring 50 to release the edge 37 of the split 35 from its abutment with the first side 45 of the stop washer projection 44 to allow the flat 20 on the valve stem to be turned away from the opposite second side 46 of the projection 44. In the apparatus shown in the drawings, the open end of the valve stem bore 18 is in effect reduced in diameter by receiving a hollow bolt 55. A nail having a stem 56 and a head 57 extends through such reduced open end and is engageable with the lug 34. An expanded means or flat 58 is formed on the stem 56 for retaining the stem against withdrawal through the reduced open end provided by the bolt 55.

The showings of all the figures correspond to the "off" position of the valve. When the valve is to be turned to the "on" position, the head 57 is pushed inwardly causing the stem 56 to push against he lug or button 34 to force the detent washer 30 axially inwardly against the bias of the spring 50. The edge 37 of the split 35 clears the side 45 of the stop washer projection 44 and it becomes possible to turn the valve stem counterclockwise (as viewed in Figure 2) through a 90 degree angle to move the flat 20 away from the edge 46 of the stop washer projection 44 and into abutting relation with the opposite edge 45 of the stop washer projection 44. The valve is then open. The detent washer 30 moves angularly with the stem 13 because the chordal edge 33 (the top portion thereof, as viewed in Figure 3) is engaged by the flat 20.

When the valve is to be closed, the stem is rotated clockwise (as viewed in Figure 2) to move the flat 20 away from the first edge 45 and into abutting relation with the second or opposite edge 46 of the stop washer projection 44. The valve is then closed. The detent washer 30 moves angularly with the stem 13 because the chordal edge 33 (the lower portion thereof, as viewed in Figure 3) is engaged by the flat 20. When the edge 37 of the split 35 passes angularly beyond the side 45 of the stop washer projection 44, the detent washer snaps into locking position.

Valves of the type to which the invention presently appears to be most pertinent are manufactured in vast quantities from brass stock. The accomplishment of the desired mechanical relationships through the use of the adjacent detent washer and stop washer as described provides a valve housing which is hardly larger than that of a conventional detentless valve of the same capacity. This accomplishes a significant cost saving over other comparable detent valves inasmuch as the washers are inexpensive to fabricate as are the remainder of the moving parts. In fact, many valves not provided with a detent arrangement nevertheless employ a flat on the valve stem so that the only increased cost over this latter case is the relatively low cost of drilling or threading the valve stem to provide the bore 18 and the cost of providing the nail 57, together with suitable retaining means such as the bolt 55. The unit cost of these latter elements is very low.

The above description of the invention should make is apparent that many details of the apparatus embodying the invention may be varied without departing from the teaching of the invention. Accordingly, the scope of the invention is not to be limited to precise details of the specifically described embodiments but is to be defined by the following claims.

What is claimed is:

1. A hollow casing having a plug seat, a plug received on said seat, a stem on said plug, a bore in said stem, said stem having an arcuate exterior surface and also having a flat which intersects said arcuate exterior surface and also intersects said bore, a pair of adjacent washers received on said stem and having arcuate inner edge portions received on said arcuate exterior surface of said stem, one of said washers constituting a stop washer, means keying said stop washer against rotation, said stop washer having a projection extending radially inwardly from its arcuate inner edge portions against opposite sides of which projection said flat abuts when said stem is turned between extreme angular portions, the other of said washers constituting a detent washer, said detent washer having an inboard section radially inward of its associated arcuate inner edge portion, said inboard section having edge portions formed as a chord of the circle on which lies its said associated arcuate inner edge portion, said chordal edge portions being received on said flat, a lug integral with a part of said inboard section and extending further radially inwardly beyond said chord to the diametrical center of said detent washer and to within said bore, a radially extending split in said inboard section dividing it into two parts the first of which includes said lug, an arcuately extending continuation of said split, said first part of said inboard section being axially displaced progressively more and more at locations proceeding from the termination of said continuation of said split and proceeding to the juncture thereof with said radially extending split, the associated edge of said radially extending split being at the same axial location as said stop washer and abutting a first of said opposite sides of said radially inwardly extending stop washer projection when said flat abuts the second of said opposite sides of said stop washer projection, compression spring means between said plug and said detent washer and urging said detent washer against said stop washer, and pushing means extending through said bore from the exterior end of said plug stem for engaging said lug to urge said washers apart against the bias of said compression spring means to release said associated edge of said radially extending split from abutment with the first of said opposite sides of said radially inwardly extending stop washer projection to allow said flat to be turned away from the second of said opposite sides of said projection and toward the first of said opposite sides of said projection.

2. A detent washer for use in adjacency with a stop washer, said detent washer having an arcuate inner edge portion, an inboard section radially inward of said arcuate inner edge portion, said inboard section having edge portions formed as a chord of the circle on which lies said associated arcuate inner edge portion, a lug integral with a part of said inboard section and extending further radially inwardly beyond said chord to the diametrical center of said washer, a radially extending split in said inboard section dividing it into two parts the first of which includes said lug, an arcuately extending continuation of said split, said first part of said inboard section being axially displaced from the remainder of the washer structure progressively more and more at locations proceeding from the termination of said continuation of said split and proceeding to the juncture thereof with said radially extending split.

3. A subassembly comprising a stem for imparting arcuate motion to a controlled member, a bore in said stem, said stem having an arcuate exterior surface and also having a flat which intersects said arcuate exterior surface and also intersects said bore, a pair of adjacent washers received on said stem and having arcuate inner edge portions received on said arcuate exterior surface of said stem, one of said washers constituting a stop washer, means keying said stop washer against rotation, said stop washer having a projection extending radially inwardly from its arcuate inner edge portions against opposite sides of which projection said flat abuts when said stem is turned between extreme angular positions, the other of said washers constituting a detent washer, said detent washer having an inboard section radially inward of its associated arcuate inner edge portion, said inboard section having edge portions formed as a chord of the circle on which lies its said associated arcuate inner edge portion, said chordal edge portions being received on said flat, a lug integral with a part of said inboard section and extending further radially inwardly beyond said chord to within said bore, a radially extending split in said inboard section dividing it into two parts the first of which includes said lug, a continuation of said split extending laterally therefrom, said first part of said inboard section being axially displaced progressively more and more at locations proceeding from the termination of said continuation of said split and proceeding to the juncture thereof with said radially extending split, the associated edge of said radially extending split being at the same axial location as said stop washer and abutting a first of said opposite sides of said radially inwardly extending stop washer projection when said flat abuts the second of said opposite sides of said stop washer projection.

4. A hollow casing having a plug seat, a plug received on said seat, a stem on said plug, a bore in said stem, said stem having an arcuate exterior surface and also having a flat which intersects said arcuate exterior surface and also intersects said bore, a pair of adjacent washers received on said stem and having arcuate inner edge portions received on said arcuate exterior surface of said stem, one of said washers constituting a stop washer, means keying said stop washer against rotation, said stop washer having a projection extending radially inwardly from its arcuate inner edge portions against opposite sides of which projection said flat abuts when said stem is turned between extreme angular positions, the other of said washers constituting a detent washer, said detent washer having an inboard section radially inward of its associated arcuate inner edge portion, said inboard section having edge portions formed as a chord of the circle on which lies its said associated arcuate inner edge portion, said chordal edge portions being received on said flat, a lug integral with a part of said inboard section and extending further radially inwardly beyond said chord to the diametrical center of said detent washer and to within said bore, a radially extending split in said inboard section dividing it into two parts the first of which includes said lug, an arcuately extending continuation of said split, said first part of said inboard section being axially displaced progressively more and more at locations proceeding from the termination of said continuation of said split and proceeding to the juncture thereof with said radially extending split, the associated edge of said radially extending split being at the same axial location as said stop washer and abutting a first of said opposite sides of said radially inwardly extending stop washer projection when said flat abuts the second of said opposite sides of said stop washer projection, compression spring means between said plug and said detent washer and urging said detent washer against said stop washer, a snap ring on the side of said stop washer opposite to said detent washer, said snap ring being engaged with said casing to retain both said washers against the urging of said spring means, the open end of the valve stem bore being reduced in diameter with respect to axially inner portions thereof, nail means extending through said reduced open end and engageable with said lug, expanded means on the stem of said nail means for retaining said stem against withdrawal through said reduced open end.

No references cited.

UNITED STATES PATENT OFFICE
CERTIFICATE OF CORRECTION

Patent No. 2,944,784            July 12, 1960

Stanley F. Jaros

It is hereby certified that error appears in the printed specification of the above numbered patent requiring correction and that the said Letters Patent should read as corrected below.

Column 4, line 1, for "portions" read -- positions --.

Signed and sealed this 6th day of December 1960.

(SEAL)
Attest:

KARL H. AXLINE            ROBERT C. WATSON
Attesting Officer            Commissioner of Patents